Patented Nov. 13, 1928.

1,691,069

UNITED STATES PATENT OFFICE.

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE.

PROCESS OF MAKING DIPOLYMER.

No Drawing. Application filed July 20, 1926. Serial No. 123,818.

The object of my invention is to produce Dipolymer.

Dipolymer, as the term is herein employed, is a product, consisting of polymerized terpene hydrocarbons, which is obtained by polymerizing dipentene, turpentine, or pine oil. Although it is largely composed of the Dipolymer $(C_{10}H_{16})_2$, substantial proportions of higher polymers, $(C_{10}H_{16})_n$, are generally present. Dipentene, as the term is herein employed, refers to the cut of pine products boiling largely between 165 and 185° C., which is obtained in the steam distillation of pine wood. Pure dipentene boils at 174–6° C., but the term dipentene as herein used is intended to comprehend the crude product with the wider boiling range.

It is known to make Dipolymer in the liquid phase by treating turpentine or dipentene with sulfuric acid of various concentrations. I have discovered that it may be prepared, in either a liquid phase or vapor phase, from pine oil, by an entirely new process presenting distinct advantages.

I have discovered that pine oil is largely converted into Dipolymer by refluxing it with a metallic chloride. The heating may be so adjusted that any water present will distill off during the heating period, along with a part of the light oil. The reaction is:

In a typical example 1000 cc. of pine oil were refluxed with 30 gms. of stannic chloride for three hours, the water being allowed to distill off. 620 cc. of Dipolymer were obtained. A portion of the light oil was polymerized on retreating with stannic chloride. A considerable amount of para-cymene is formed, which is not polymerized.

Because water is first split off from the pine oil, it was expected that the water would destroy the activity of the metallic chloride and prevent polymerization. Contrary to expectations, such was not the case.

Polymerization of dipentene in the vapor phase may be carried out, at temperatures ranging from 175–550° C., by passing the vapors of pine oil through a tube of iron or other suitable material at such a rate as will permit the vapors to remain in contact with a metallic chloride, such as zinc chloride, contained in the tube, long enough to cause partial polymerization. A portion of the unpolymerized oil may be polymerized by repassing through the tube.

The crude product which is obtained on polymerizing pine oil may be employed, in some instances, without refining; but it is usually preferable to distill off the lower boiling end, cutting around 250° C. By this procedure, the hydrocarbons and any unaltered pine oil are separated, leaving a residue consisting of crude Dipolymer.

A typical sample of crude Dipolymer has a specific gravity of 0.95, and the following boiling range: 5% over at 305° C., 20% at 326° C., 50% at 335° C., 70% at 342° C. and 90% at 375° C. If a cut is made when approximately 80% has distilled over, a product is obtained having a specific gravity of 0.94. A second cut may be made comprising approximately the 80–95% portion of the crude Dipolymer. This cut is exceedingly viscous and resembles a soft rosin. The residue is hard and brittle and has the appearance of a dark colored rosin. For some applications of the Dipolymer it may be desirable to separate it into cuts as outlined above.

It is believed that any of the metallic chlorides are workable. For example, in place of stannic chloride, there may be employed any of the chlorides of aluminum, iron, zinc and antimony. Anhydrous metallic chlorides are preferable to the hydrated, but if a quite active metallic chloride, such as stannic chloride, is employed, the hydrated form may be practically as efficient, if not preferable. A mixture of metallic chlorides may be employed. In certain cases, it may be desirable to utilize a metallic chloride as a constituent of a catalytic mixture, as, for example, fuller's earth, or other silicious or argillaceous earth, impregnated with the metallic chloride.

I have not herein claimed the use of fuller's earth or other silicious or argillaceous earth as a catalyst, as such forms the subject matter of an application filed by me on July 20, 1926, Serial No. 123,812.

Having now fully described my invention, what I claim and desire to protect by Letters Patent is:

1. The process of preparing "Dipolymer" from pine oil, which includes treating pine oil with a metallic chloride and heat to effect dehydration of components of the pine oil and the formation of dipentene and continuing the treatment for a time sufficient to effect conversion of a substantial proportion thereof and of the dipentene into di and higher polymers.

2. The process of preparing "Dipolymer" from pine oil, which includes treating pine oil with a metallic chloride and heat for the production of conversion products and dipentene by splitting off water from certain components of the pine oil and continuing the treatment to effect conversion of a substantial proportion of the conversion products and of the dipentene into di and higher polymers.

In testimony of which invention I have hereunto set my hand, at Philadelphia, Pennsylvania, on this 2nd day of July, 1926.

IRVIN W. HUMPHREY.